April 11, 1950     A. J. GROSSNIKLAUS     2,503,945
COMBINATION MANTEL, AQUARIUM, AND FOUNTAIN
Filed April 6, 1946
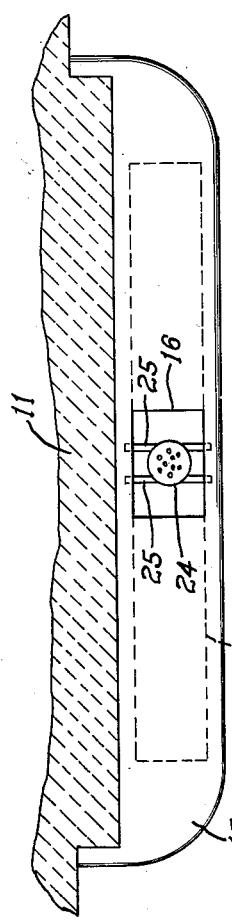
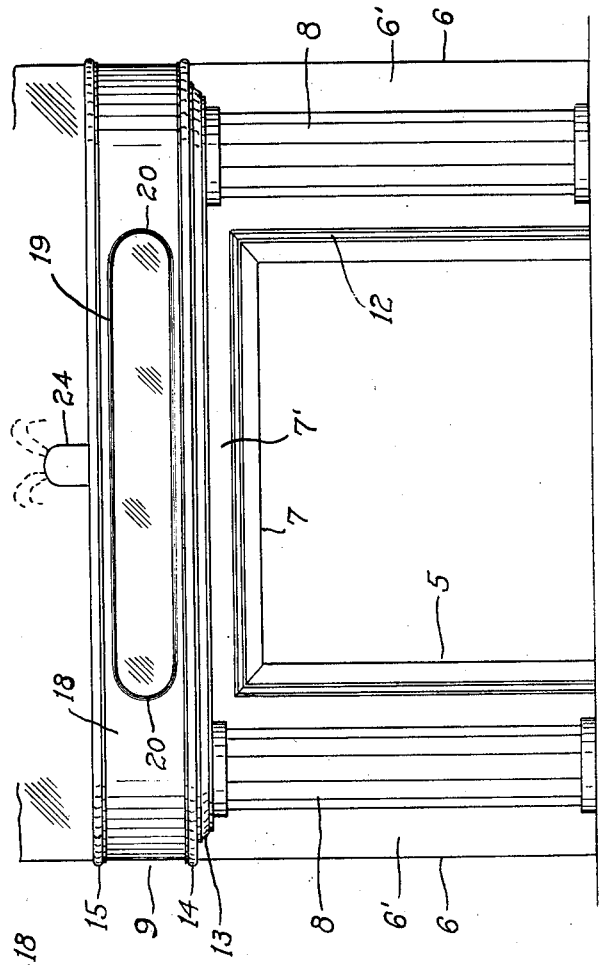
INVENTOR.
Alice J. Grossniklaus
BY
Frease and Bishop
ATTORNEYS Patented Apr. 11, 1950

2,503,945

UNITED STATES PATENT OFFICE 2,503,945

COMBINATION MANTEL, AQUARIUM, AND FOUNTAIN

Alice J. Grossniklaus, Wilmot, Ohio

Application April 6, 1946, Serial No. 660,273

2 Claims. (Cl. 119—5)

The invention relates generally to a combined mantel and aquarium as a new article of manufacture, and more particularly to a mantel embodying an aquarium adapted for maintaining tropical fish in a healthy condition. An aquarium for tropical fish must be continuously aerated and maintained at a substantially constant temperature in order that the fish be kept alive and in healthy condition.

I have discovered that by incorporating an aquarium in the mantel of a fireplace and mounting a small fountain thereon for spraying the water of the aquarium into the air of the room above the same, not only is the water easily maintained at substantially constant temperature and properly aerated, but the atmosphere of the room is beneficially humidified.

It is therefore a general object of the present invention to provide, as a new article of manufacture, a new and improved fireplace construction incorporating an aquarium in the mantel thereof.

Another object is to provide a mantel embodying an aquarium having means for continuously aerating the water of the aquarium.

A further object is to provide a mantel construction embodying an aquarium and having means for insulating the aquarium from the fireplace so as to maintain a substantially constant temperature in the aquarium.

Finally, it is an object of the present invention to provide a novel and improved combination mantel and aquarium which is so constructed and arranged so as to be easily incorporated in a variety of sizes and designs of fireplaces in a manner to enhance the appearance thereof.

These and other objects are accomplished by the parts, constructions, arrangements and combinations which comprise the present invention, a preferred embodiment of which is set forth in the following description and illustrated in the accompanying drawing, and which is particularly and distinctly pointed out and set forth in the appended claims forming part hereof.

Referring to the drawing in which a preferred embodiment of the invention is shown by way of example;

Figure 1 is a front elevation of a fireplace embodying the improved combination mantel and aquarium;

Fig. 2 is a fragmentary plan elevational view thereof; and

Fig. 3 is an enlarged, fragmentary, vertical, sectional view thereof.

Similar numerals refer to similar parts throughout the several views of the drawing.

The fireplace shown in the drawing preferably includes the rectangular hearth opening 5 which is formed by the side wall portions 6 and the top wall portion 7, there being preferably columns 8 positioned at the front of the side wall portions 6 supporting a mantel indicated generally at 9 in front of the top wall portion 7 and extending entirely across the same.

The hearth opening of the fireplace is preferably lined with fire bricks 10 in a usual manner, above which are supported the usual bricks 11 forming the front wall of the fireplace and extending upwardly to form the chimney therefor. The side walls 6 and top wall 7 may have a wood facing thereon as indicated at 6' and 7' respectively, and the hearth opening 5 may be bordered with a molding 12 if desired. As shown the columns 8 may support a transverse ornamental wood piece 13 which overhangs the top of the columns, and the piece 13 in turn supports a bottom mantel board 14 which overhangs the piece 13 and extends the full width of the fireplace.

A top mantel board 15 of substantially the same length and width as the bottom board is spaced above the same and provides the top surface of the mantel, being provided with a central rectangular opening 16. At the rear side of the top and bottom boards 14 and 15 a rear wall board 17 abuts the brick work 11 and extends between the top and bottom mantel boards to provide the rear wall of the mantel. At the front side of the mantel, a front wall board 18 extends between the top and bottom boards 14 and 15 to form the front wall of the mantel. The ends of top and bottom wall boards 14 and 15 and the front wall board 18 are curved on a radius, as indicated, to give an attractive appearance to the mantel, and in the central portion of the front wall board 18, an elongated opening 19 having circular ends 20 is provided to give a recessed panel effect.

An elongated tank 21 of preferably rectangular cross section is positioned within the mantel 9 and may be constructed entirely of glass as shown, at least the front wall being of glass or other transparent material so that the contents of the tank or aquarium 21 are visible through the transparent front wall and the panel opening 19.

In order to derive the benefit of the warmth of the fireplace in cold weather, without the possibility of overheating the aquarium so as to endanger the lives or condition of the tropical fish therein, I have provided a bottom wall 22 and a rear wall 23 of insulation material, such as rock wool, between the bottom mantel board 14 and rear wall board 17 and the tank, and I have found that such insulation insures against overheating of the water in the aquarium when the fireplace becomes hot. However, the location of the aquarium in the mantel of the fireplace provides a moderately warm location which is well off the floor of the room and away from windows or drafts, so that the temperature of the water in the aquarium is easily maintained substantially constant as required.

A fountain 24 for spraying the water of the aquarium into the air of the room above the same is preferably supported over the opening 16 in the top mantel board 15 by means of metal strips 25 or the like. A suitable motor driven pump indicated diagrammatically at 26 is mounted within the fountain 24 and has an intake pipe 27 extending into the water in the aquarium, the discharge of the pump being directed into an upper fountain chamber 28 to spray water out of jets 29 in the upper wall of the fountain with such force and direction that the water falls back into the tank through the opening 16.

The water sprays issuing from the jets serve to aerate the water of the fountain, because the water immediately falls back into the tank, and such aeration is essential for maintaining the tropical fish in the aquarium in a healthy condition. At the same time, the water sprays in passing through the atmosphere of the room serve to humidify the same, which is especially important in cold weather when the heated air of the room becomes too dry.

The improved combination mantel and aquarium may be constructed of different materials than those disclosed herein without departing from the scope of the invention, and the dimensions and proportions as well as the shape and configuration of the various parts may be modified.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. A combination mantel and aquarium including top and bottom, front and rear walls forming a hollow mantel, an aquarium in said mantel having a transparent front wall, means insulating the bottom and rear walls of said aquarium from the heat of the fireplace to maintain the temperature of the aquarium water substantially constant, said front mantel wall having a panel opening exposing said transparent aquarium wall and said top mantel wall having an opening above said aquarium to aerate the water therein.

2. A combination mantel and aquarium including top and bottom, front and rear walls forming a hollow mantel, an aquarium in said mantel having a transparent front wall, means insulating the bottom and rear walls of said aquarium from the heat of the fireplace to maintain the temperature of the aquarium water substantially constant, said front mantel wall having a panel opening exposing said transparent aquarium wall, and the water of said aquarium being open to the atmosphere through the walls of said mantel.

ALICE J. GROSSNIKLAUS.

REFERENCES CITED

The following references are of record in the file of this patent:

UNITED STATES PATENTS

| Number | Name | Date |
|---|---|---|
| 919,157 | Glacer | Apr. 20, 1909 |
| 2,144,551 | Skolnick | Jan. 17, 1939 |
| 2,293,612 | Montague | Aug. 18, 1942 |